(12) United States Patent
Shin et al.

(10) Patent No.: US 6,531,839 B1
(45) Date of Patent: Mar. 11, 2003

(54) CIRCUIT AND METHOD FOR MOTOR CONTROL

(75) Inventors: Yong-Sang Shin, Seoul (KR); Dong-Gyu Kim, Seoul (KR); Sung-Jun Joo, Seoul (KR)

(73) Assignee: Fairchild Korea Semiconductor Ltd. (KR)

( * ) Notice: Subject to any disclaimer, the term of this patent is extended or adjusted under 35 U.S.C. 154(b) by 0 days.

(21) Appl. No.: 09/533,645

(22) Filed: Mar. 22, 2000

(30) Foreign Application Priority Data

Mar. 22, 1999 (KR) .............................................. 99-9646

(51) Int. Cl.[7] .............................................. H02P 7/04
(52) U.S. Cl. ........................ 318/371; 318/362; 318/372; 318/373; 318/375
(58) Field of Search ................................ 318/362, 371, 318/372, 373, 375

(56) References Cited

U.S. PATENT DOCUMENTS

| 3,633,084 A | * | 1/1972 | Rakes | 318/377 |
|---|---|---|---|---|
| 3,774,095 A | * | 11/1973 | Coccia | 318/371 |
| 3,809,328 A | * | 5/1974 | Cope et al. | 242/184 |
| 4,278,921 A | * | 7/1981 | Medding et al. | 318/254 |
| 4,445,167 A | * | 4/1984 | Okado | 318/811 |
| 4,622,499 A | * | 11/1986 | Squires et al. | 318/138 |
| 5,012,169 A | * | 4/1991 | Ono et al. | 318/568 |
| 5,343,382 A | * | 8/1994 | Hale et al. | 363/98 |
| 5,659,231 A | * | 8/1997 | Svarovsky et al. | 318/138 |
| 5,859,519 A | * | 1/1999 | Archer | 318/801 |
| 5,914,582 A | * | 6/1999 | Takmoto et al. | 318/299 |

\* cited by examiner

*Primary Examiner*—Rita Leykin
(74) *Attorney, Agent, or Firm*—Blakely Sokoloff Taylor & Zafman

(57) ABSTRACT

Disclosed is an optimized brake method for braking a motor rotating at a high speed. When the motor rotates at the high speed, the present invention reduces the rotation speed of the motor using a mechanical brake method which has a relatively high rate of energy exhaustion, and when the rotation speed of the motor reduces below a predetermined speed, the present invention stops the motor using an electrical brake method. Therefore, since the mechanical brake method is used during the high speed rotation interval, heat occurrence can be prevented, and the electrical brake method is used during the relatively low speed interval so that the motor can be stopped within a short time.

15 Claims, 16 Drawing Sheets

CIRCUIT AND METHOD FOR MOTOR CONTROL

BACKGROUND OF THE INVENTION (a) Field of the Invention

The present invention relates to a circuit and method for a motor control. More specifically, the present invention relates to a circuit and method for a brake control of a spindle motor.

(b) Description of the Related Art

Spindle motors are used to drive compact disc read only memories (CD-ROMs), digital video disks (DVDs) and video cassette recorders (VCRs), and a brushless direct current (BLDC) motor is the main mode of spindle motor in use.

A motor converts electrical energy into mechanical energy, and the rotation speed and rotation direction of the motor depend on the strength and direction of the current supplied to the motor. Conventionally, a motor driving circuit includes an inverter for controlling the strength and direction of the current supplied to the motor, and the inverter includes a plurality of switches.

Switching sequences of a switch of the inverter in the conventional BLDC motor are adjusted with an identical phase of the back electromotive force (BEMF) supplied to the motor so as to rotate the motor in the forward direction (will be referred to as a forward rotation hereinafter), and the speed of the motor is controlled by controlling the current flowing to each switch (i.e., the current flowing to the motor).

On the other hand, when it is necessary to stop the motor from moving in the forward rotation at the desire of a user, a method for stopping the motor is referred to as a brake method.

Brake methods of the conventional spindle motor are categorized as a mechanical brake method and an electrical brake method.

The mechanical brake method is such that when the user wants to brake the spindle motor, all the switches of the inverter are switched off so as to stop the supply of electrical energy. Since the motor exhausts the current energy as friction energy according to the mechanical brake method, the motor finally stops. However, when using this method, the time it takes to stop the motor is significant, and therefore this method can only be applied to systems in which the time it takes to stop the motor is not important.

Examples of the conventionally used electrical brake method are categorized as a reverse brake method that controls the switching sequences of the switch so the current in the motor flows in a phase opposite to the BEMF supplied when the motor is moving in the forward rotation; and a short brake method that turns off an upper switch (i.e., the switch for supplying the motor with the current from the voltage) of the inverter and turns on a lower switch (i.e., the switch for supplying the ground with the current from the motor) of the inverter so as to extinguish the motor energy by using only elements of the lower switch.

The above-noted electrical brake method has a merit of stopping the motor in a shorter time, however it has a deficiency of excess heat generation in the switches of the inverter. This problem of heat generation becomes greater as faster CD-ROMs such as 44x-speed CD-ROMs appear.

SUMMARY OF THE INVENTION

It is an object of the present invention to provide an optimized circuit and method for a motor brake for solving the problems of excess stopping time and heat generation that occur when the user tries to brake the motor.

In one aspect of the present invention, in a method for controlling a motor control circuit comprising an inverter including a first switch unit comprising a plurality of switches coupled between each voltage source and phase of the motor and a second switch unit comprising a plurality of switches coupled between the motor and the ground, and a switching controller controlling onloff operations of each switch of the inverter, the method comprises the steps of: (a) adjusting switching sequences of the switches of the inverter and adjusting direction of the current flowing to the motor in order for the motor to rotate in the forward direction; (b) turning off all the switches of the inverter in order for the rotation speed of the motor to reduce by mechanical frictions; and (c) making, when the reduced speed of the motor is slower than a first speed, the energy supplied to the motor exhaust itself through the switches of the inverter in order to reduce the speed of the motor.

The step (c) is characterized in that all the switches of the first switch unit are turned off and all the switches of the second switch unit are turned on so as to reduce the speed of the motor, and that the switching sequences of the switches of the inverter are adjusted so that the current flows in the opposite direction of the step (a), and therefore, the speed of the motor is reduced.

In another aspect of the present invention, a motor control circuit comprises: an inverter including a first switch unit comprising a plurality of switches coupled between each voltage source and phase of the motor and a second switch unit comprising a plurality of switches coupled between each motor and the ground; a switching controller, that when receiving an acceleration signal from the outside controls the switching sequences of the switches of the inverter in order for the motor to rotate in the forward direction, and when receiving a brake start control signal from the outside, turns off all the switches of the inverter so that the rotation speed of the motor is reduced by the mechanical frictions; and an electrical brake determiner outputting an electrical brake start signal to the switching controller when the rotation speed of the motor is slower than a first speed because of the mechanical friction of the motor, wherein the switching controller, when receiving the electrical brake start signal from the electrical brake determiner, makes the energy supplied to the motor exhaust itself through the switches of the inverter so that the speed of the motor is reduced.

The switching controller, when receiving the electrical brake start signal, turns off all the switches of the first switch unit and turns on all the switches of the second switch unit.

The switching controller, when receiving the electrical brake start signal, controls the switching sequences of the switches of the inverter in order for the current to flow in the direction opposite to the direction of the current when the motor rotates in the forward direction.

The electrical brake determiner comprises: a speed detector detecting the rotation speed of the motor; and a speed comparator comparing the detected rotation speed of the motor with the first speed, and when the rotation speed of the motor is slower than the first speed, outputting the electrical brake start signal to the switching controller.

The speed detector comprises: a comparator comparing a hall signal from a hall sensor with a reference voltage and outputting pulse type signals; and a counter receiving the output signals of the comparator and counting the number of the pulse type signals, and computing the rotation speed of the motor from the counted pulse type signals and counting time.

The speed detector obtains the rotation speed of the motor through information stored in a storage media driven by the motor.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

In the following detailed description, only the preferred embodiment of the invention has been shown and described, simply by way of illustration of the best mode contemplated by the inventor(s) of carrying out the invention. As will be realized, the invention is capable of modification in various obvious respects, all without departing from the invention. Accordingly, the drawings and description are to be regarded as illustrative in nature, and not restrictive.

Figure 1:
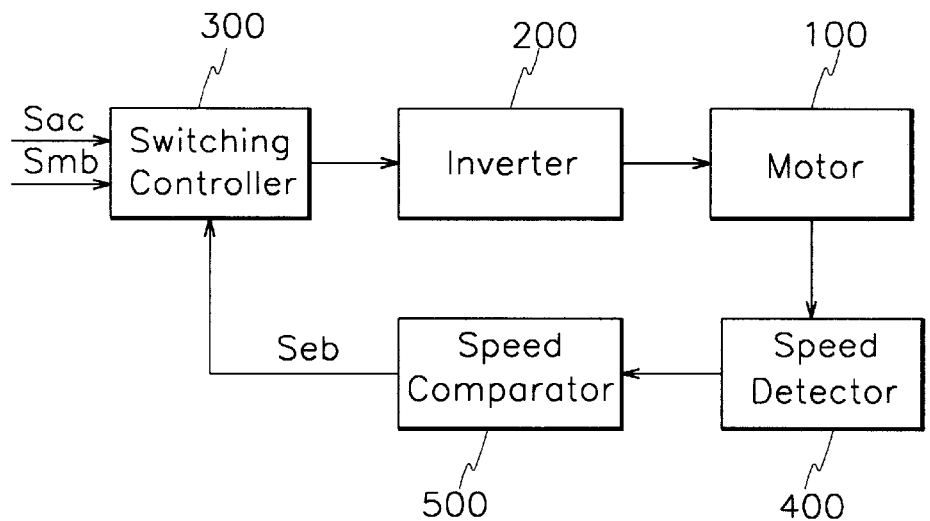
FIG. 1 is a schematic diagram of a motor control system according to a first preferred embodiment of the present invention.

FIG. 1 shows a schematic diagram of a motor control system according to a first preferred embodiment of the present invention. As shown, the motor control system according to the first preferred embodiment of the present invention comprises a motor 100, an inverter 200, a switching controller 300, a speed detector 400, and a speed comparator 500. Here, the speed detector 400 and the speed comparator 500 configure an electrical brake determiner.

The motor 100 converts the electrical energy into mechanical energy, and a three-phase BLDC spindle motor is used in the preferred embodiment of the present invention. A general three-phase BLDC motor comprises three-phase (U, V and W phases) coils installed on a stator, and a permanent magnet installed on a rotor. The permanent magnet has N and S polarities for generating rotary power to rotate the motor.

Figure 2:
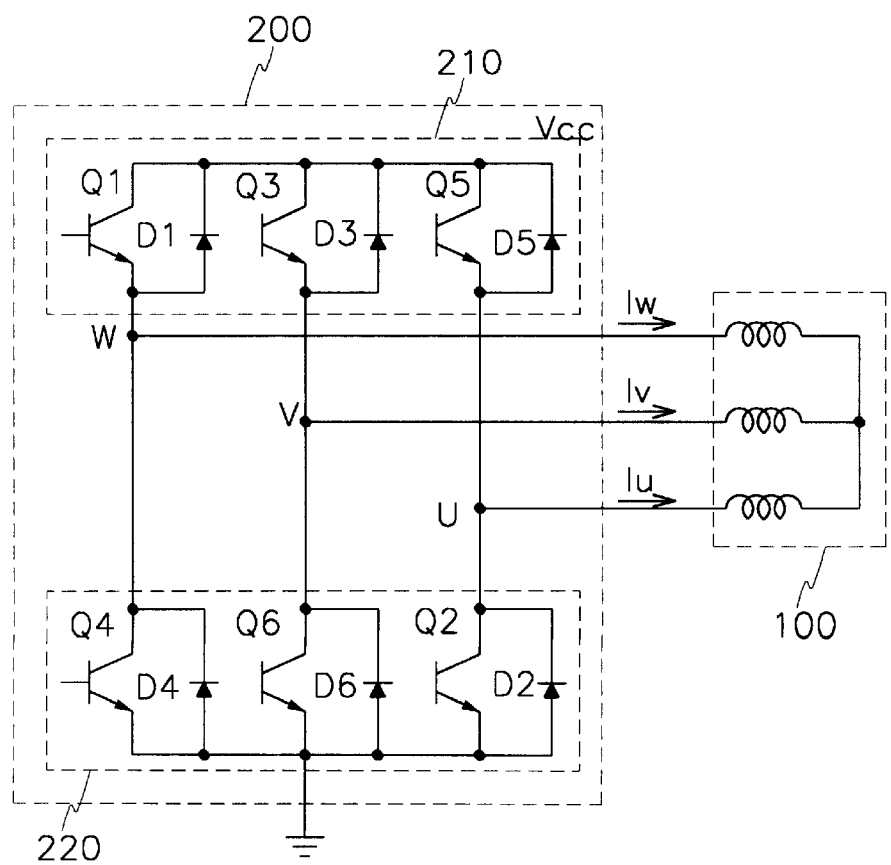
FIG. 2 is a detailed schematic diagram of a motor and inverter of FIG. 1.

The inverter 200 comprises a plurality of switches, and the direction of the current supplied to the motor is determined by the on/off operations of the switches. FIG. 2 is a detailed schematic diagram of the motor 100 and inverter 200 according to the preferred embodiment of the present invention.

As shown, the inverter 200 comprises six transistors Q1 through Q6 and six diodes D1 through D6. The transistors Q1, Q3 and Q5 form an upper switch unit 210, and each switch switches the current supplied from the voltage source to the W, V and U phases of the motor. The transistors Q4, Q6 and Q2 form a lower switch unit 220 and each switch switches the current supplied from the W, V and U phases of the motor to ground. The diodes D1 through D6 are free-wheeling state diodes, each of which is connected between an emitter and collector of each transistor Q1 through Q6.

The switching controller 300 controls the on/off operations of the transistors of the inverter 200 so as to control the direction of the current supplied to the motor and whether or not to supply the current from the voltage source to the motor, and also controls a base current supplied to each transistor of the inverter so as to control the size of the current supplied to the motor.

Generally, when the current is supplied to each phase of the stator coil of the three-phase BLDC motor, the motor starts to rotate as a result of the magnetic field formed by this current and the permanent magnet installed on the rotor. At this time, in order to continuously rotate the rotor in a single direction, the direction of the current flowing to each phase of the rotor must be sequentially switched (referred to as a rectification), and for this, the switching operations of each transistor of the inverter must be sequentially adjusted. The switching controller 300 adjusts the switching sequences of the transistors of the inverter so as to control the forward rotation and brake of the motor.

Figure 3:
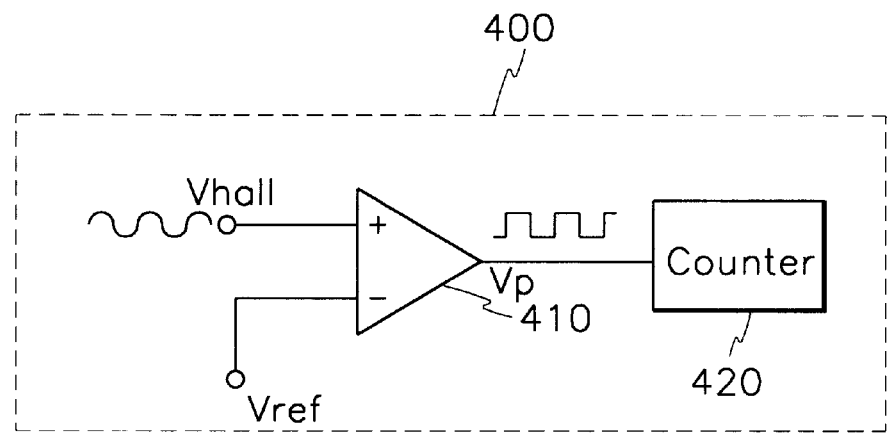
FIG. 3 is an example of a speed detector of FIG. 1.

Referring to FIG. 3, the speed detector 400 detects the revolutions per minute (rpm) of the motor.

The speed detector 400 comprises a comparator 410 and a counter 420. The comparator 410 receives a hall signal Vhall output from a hall sensor (not depicted) through a non-inverting terminal and a reference voltage Vref through an inverting terminal so as to output a pulse-type voltage Vp. The hall sensor, installed outside of the motor, detects waveforms of the intensity of magnetic poles of the permanent magnet, and the hall signals output from the hall sensor have sine wave forms. For example, if it is assumed that six pair of N and S poles are formed on the motor, when the motor rotates one cycle, the output signals of the hall signals are six sine waves, and thereby the number of rotations of the motor can be found by measuring the number of sine waves of the hall signal.

Figure 4:
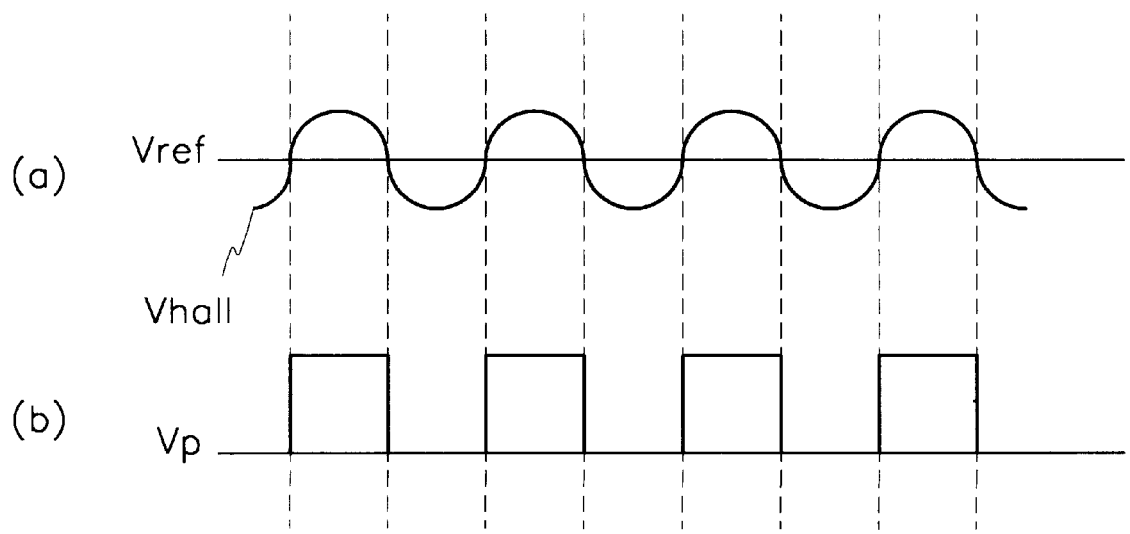
FIG. 4 shows waveforms of input and output signals of the speed detector of FIG. 3.

The comparator 410 compares the hall signal Vhall with the reference voltage Vref (for example, the ground voltage)

so as to output pulse type signals Vp. FIG. 4 shows the hall signal Vhall, reference voltage Vref and output signal Vp supplied to the comparator 410.

The counter 420 receives the pulse-type output signals output from the comparator 410 and counts the number of pulses of the output signals so as to compute the speed of the motor, and divides the speed of the motor by a counted time so as to compute the rotational speed of the motor. The motor speed counted by the counter 420 is output to the speed comparator 500.

On the other hand, the speed detector 400 of the motor can also be implemented in a following method. Generally, when recording data, storage media such as a CD-ROM also record synchronization signals. An identical number of synchronization signals is formed for each radius of the CD-ROM. Therefore, the speed of the motor can be indirectly computed by detecting the synchronization signals, and accordingly, the rotation speed of the motor can be detected. Also, the rotation speed of the motor can be obtained by other data information, which will not be described since a person in the art can easily implement these.

The speed comparator 500 compares the reference speed with the rotation speed of the motor as detected by the speed detector 400, and if the rotation speed of the motor is slower than the reference speed, an electrical brake control signal is output to the switching controller 300.

Figure 5:
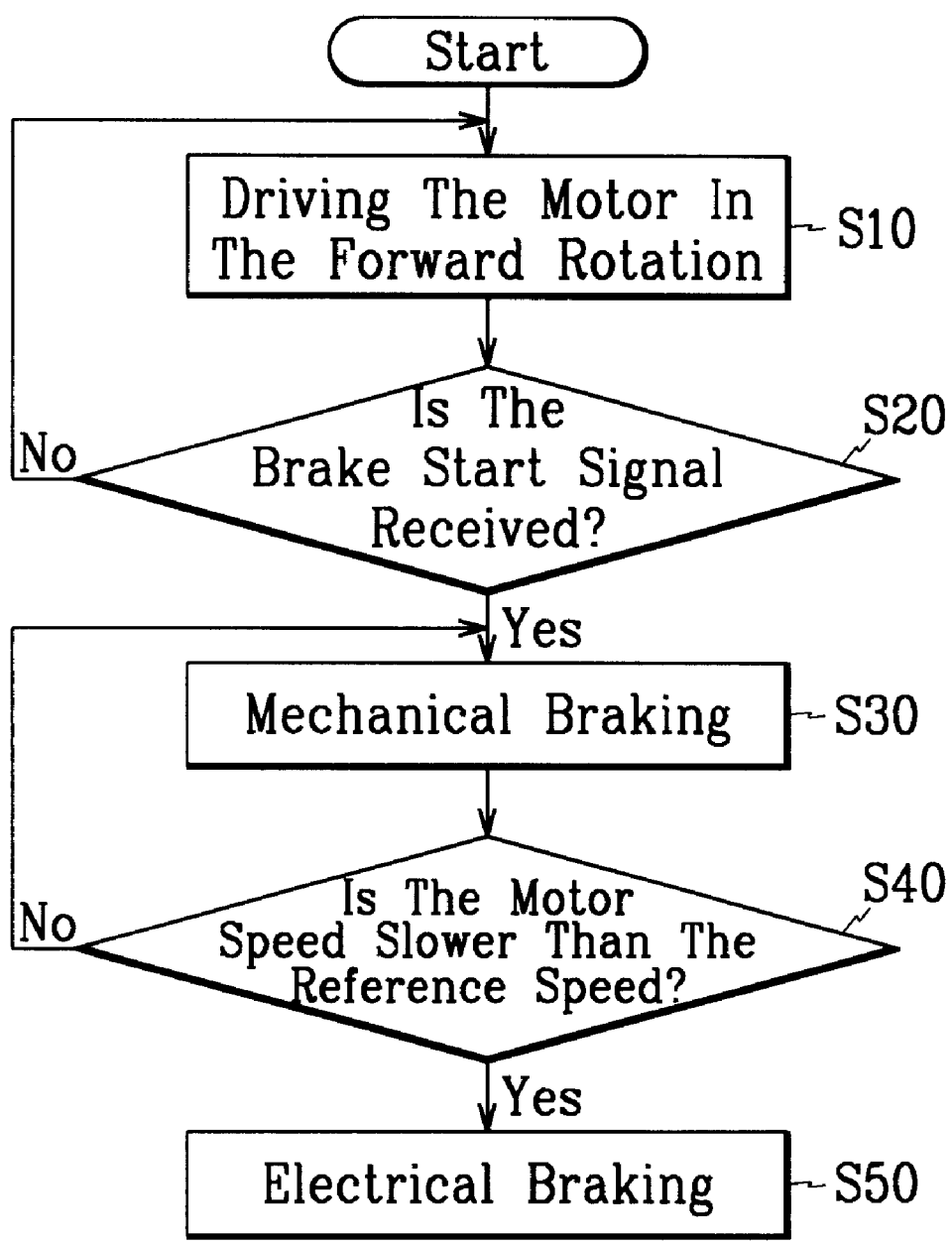
FIG. 5 is a flow chart of an operation of the motor control system according to the first preferred embodiment of the present invention.

Referring to FIGS. 1 through 5, operation according to the first preferred embodiment of the present invention will now be described. FIG. 5 is a flow chart of an operation of the motor control system according to the first preferred embodiment of the present invention.

First, when a motor accelerating control signal Sac is supplied to the switching controller 300 from the outside, the switching controller 300 adjusts the switching sequences of each transistor of the inverter 200 in order for the motor to move in the forward rotation, in step S10. At this time, the switching controller 300 controls the current supplied to a base of each transistor so as to control the current supplied to the motor, and thereby the rotation speed of the motor is controlled. On/off waveforms of the transistors of the inverter are formed when the motor moves in the forward rotation, and the waveforms of the phase voltage and the BEMF of the motor are shown in FIG. 6.

Figure 6:
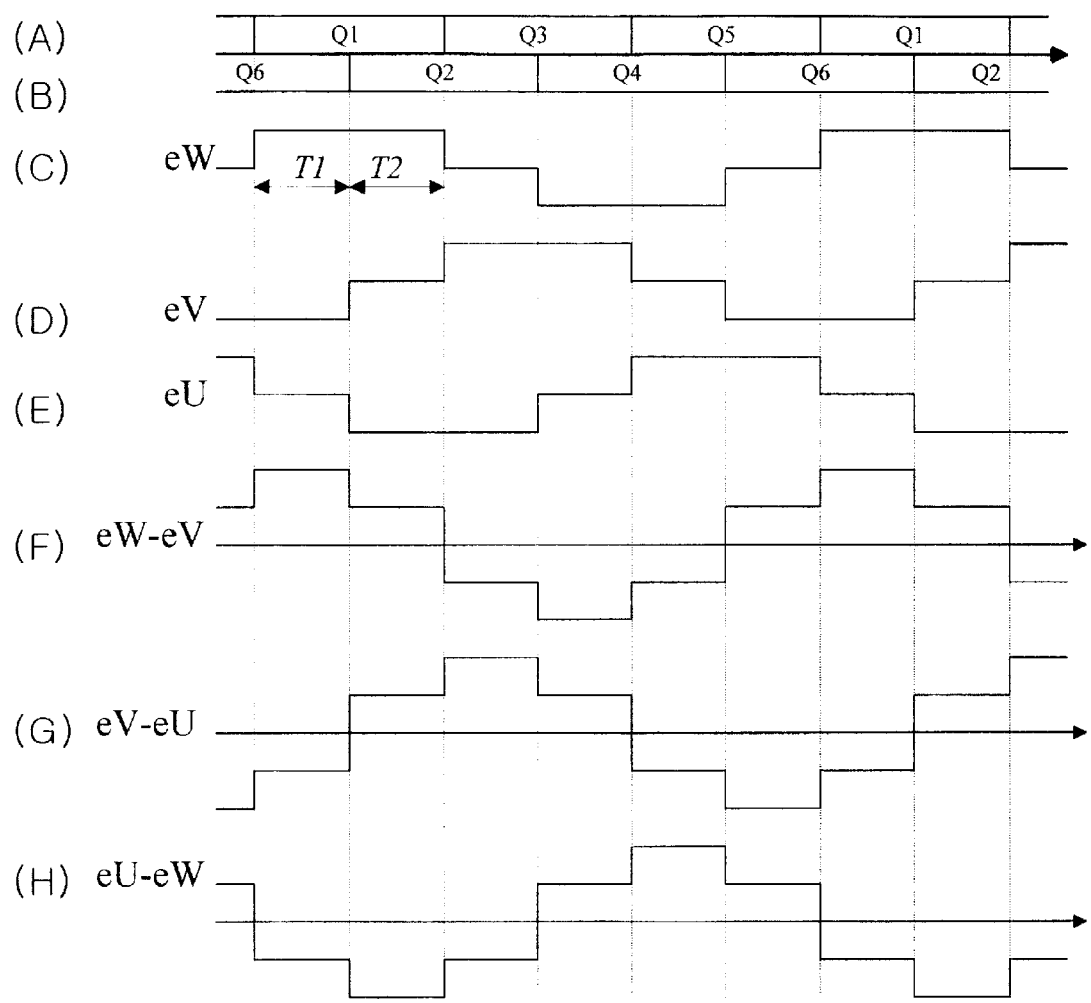
FIG. 6 shows waveforms when the motor moves in the forward rotation.

Referring to FIG. 6, (A) shows ON status waveforms of the transistors Q1, Q3 and Q5 forming the upper switch unit 210, and (B) shows ON status waveforms of the transistors Q4, Q6 and Q2 forming the lower switch unit 220. As shown in FIGS. 6(A) and (B), the transistors of the inverter perform on/off switching operations with a predetermined sequence. At this time, for example, during a period (T1+T2) when the upper transistor Q1 is turned on, the transistor Q6 is turned on during the period T1, and the transistor Q2 is turned on during the period T2.

On the other hand, each of (C), (D) and (E) of FIG. 6 show the W, V, and U phase voltage of the motor, and each of (F), (G) and (H) of FIG. 6 show the voltage between the W phase and V phase, the V phase and U phase, and the U phase and W phase.

Next, the switching controller 300 determines whether it has received a brake start control signal Smb from the outside in step S20, and when the brake start control signal Smb is received, the motor is mechanically braked in step S30. That is, when the switching controller 300 receives the brake start control signal Smb, all the transistors of the inverter are turned off so that the current is not supplied to the motor from the external power and the current based on the BEMF of the motor is not supplied to the ground. Therefore, since the energy that the motor has is exhausted by friction, the rotation speed of the motor gradually decreases.

At this time, the speed comparator 500 compares the rotation speed of the motor detected by the speed detector 400 with a predetermined reference value in step S40, and in the case when the rotation speed of the motor is slower than the reference value, the speed comparator 500 outputs an electrical brake start signal Seb to the switching controller 300. On receiving the electrical brake start signal Seb, the switching controller 300 makes the motor operate in the reverse brake method or short brake method to be described hereinafter.

Next, referring to FIGS. 7(a) and (b) and FIGS. 8(a) to (d), the reverse brake method according to the preferred embodiment of the present invention will be described.

Figure 7A:
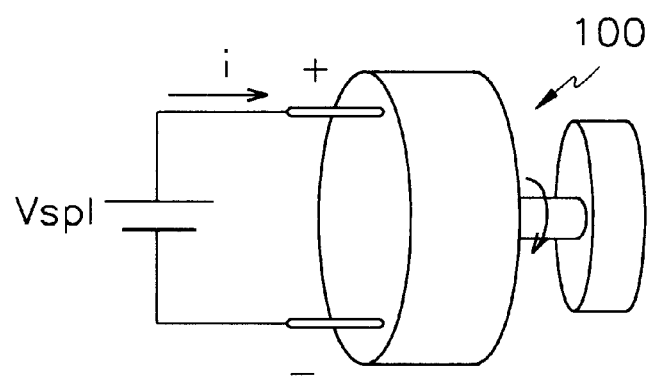
FIGS. 7(a) and (b) show a relationship between the motor and the voltage supplied to the motor in the forward rotation mode and reverse brake mode.

FIGS. 7(a) and (b) show the relationship between the motor and the voltage supplied to the motor in the forward rotation mode and reverse brake mode. As shown in FIG. 7(a), in the case when the motor moves in the forward rotation, the current i is supplied to the motor by the outside voltage Vspl, and the BEMF Vbemf with an opposite polarity of the voltage is generated. Therefore, the effective voltage at this time is as follows:

$$Veff = Vspl - Vbemf \qquad \text{Equation 1}$$

Figure 7B:
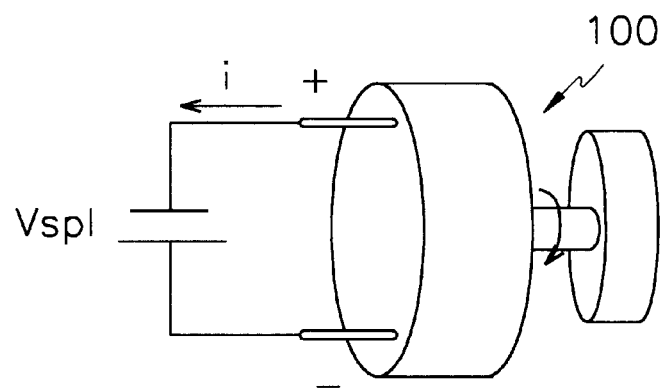

On the other hand, in the case when the reverse brake mode starts, as shown in FIG. 7(b), the polarity of the voltage Vspl supplied to the motor is changed. That is, the polarity of the voltage Vspl becomes identical with the polarity of the BEMF Vbemf. Hence, the effective voltage at this time is as follows:

$$Veff = Vspl + Vbemf \qquad \text{Equation 2}$$

Therefore, the effective voltage in the reverse brake mode increases compared to the forward rotation mode, and accordingly the current flowing to the transistor of the inverter increases, and therefore a lot of heat occurs.

Figure 8A:
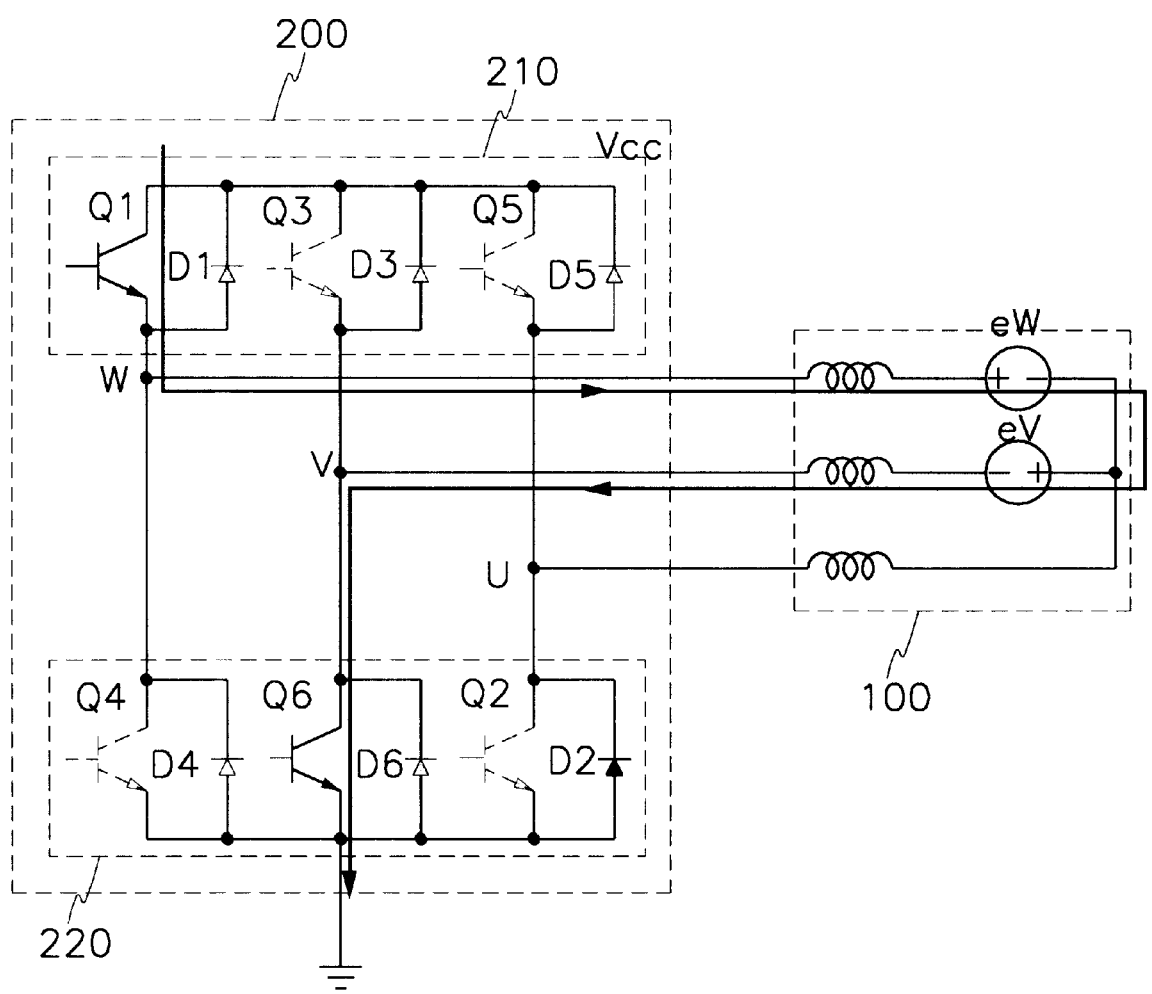
FIGS. 8(a) through (d) are schematic diagrams indicating the current direction of the inverter in the forward rotation mode and reverse brake mode.
Figure 8B:
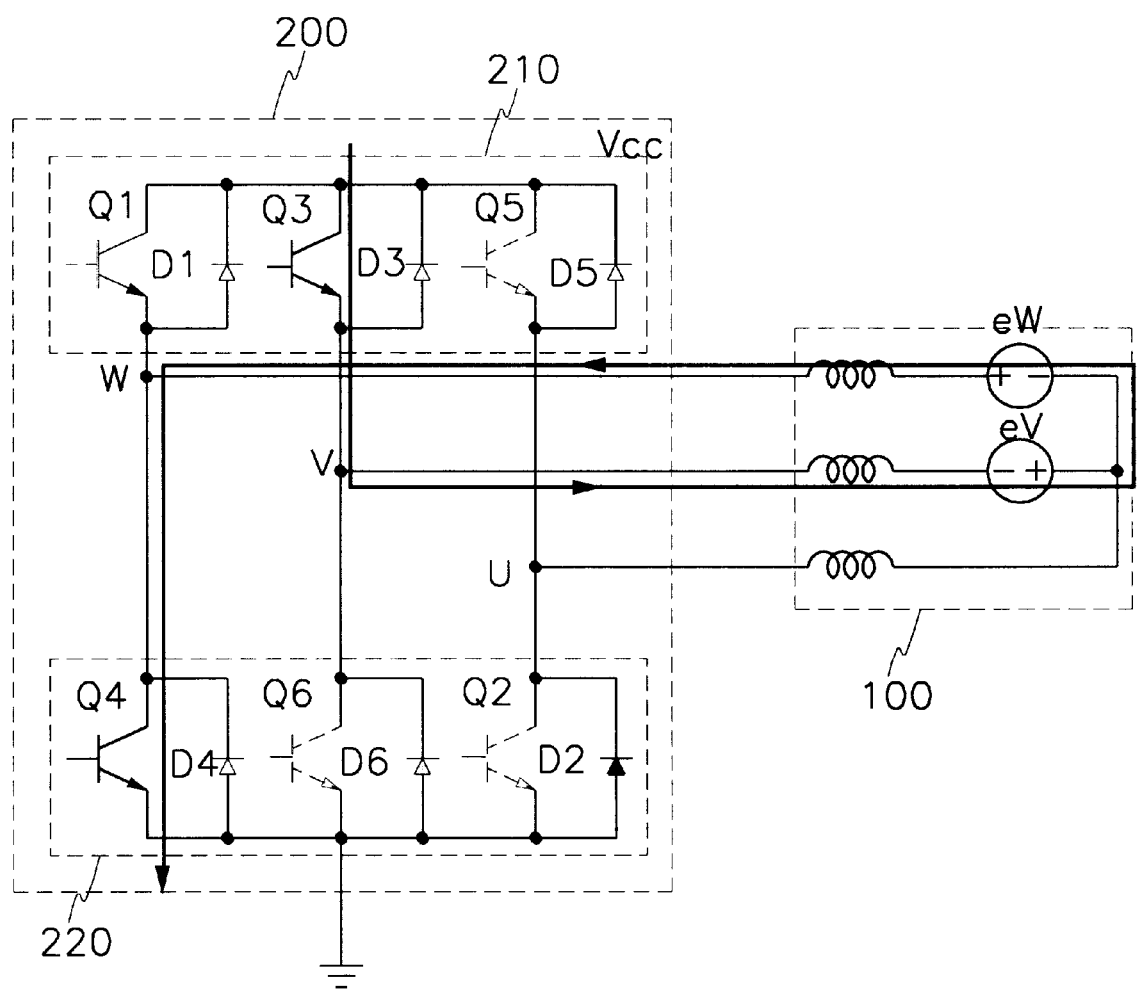
Figure 8C:
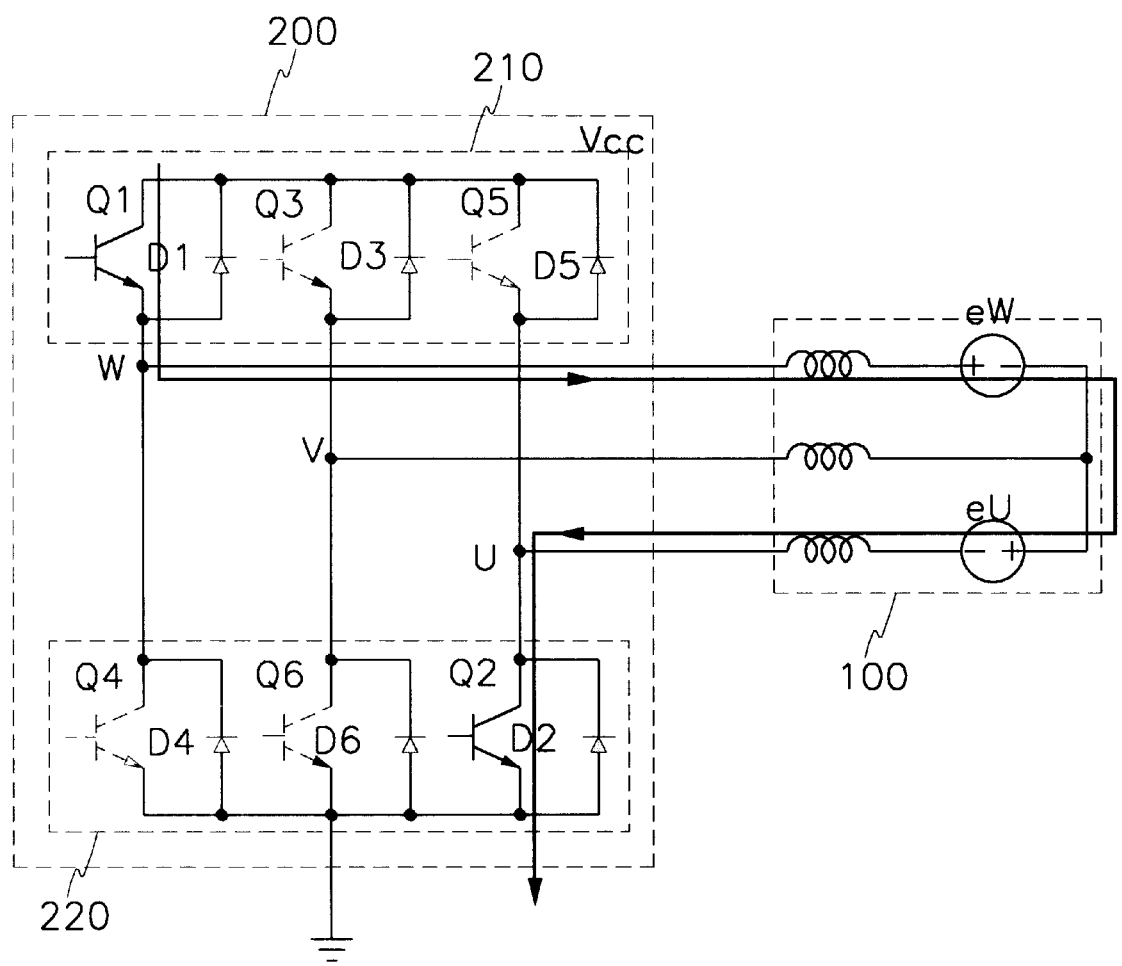
Figure 8D:
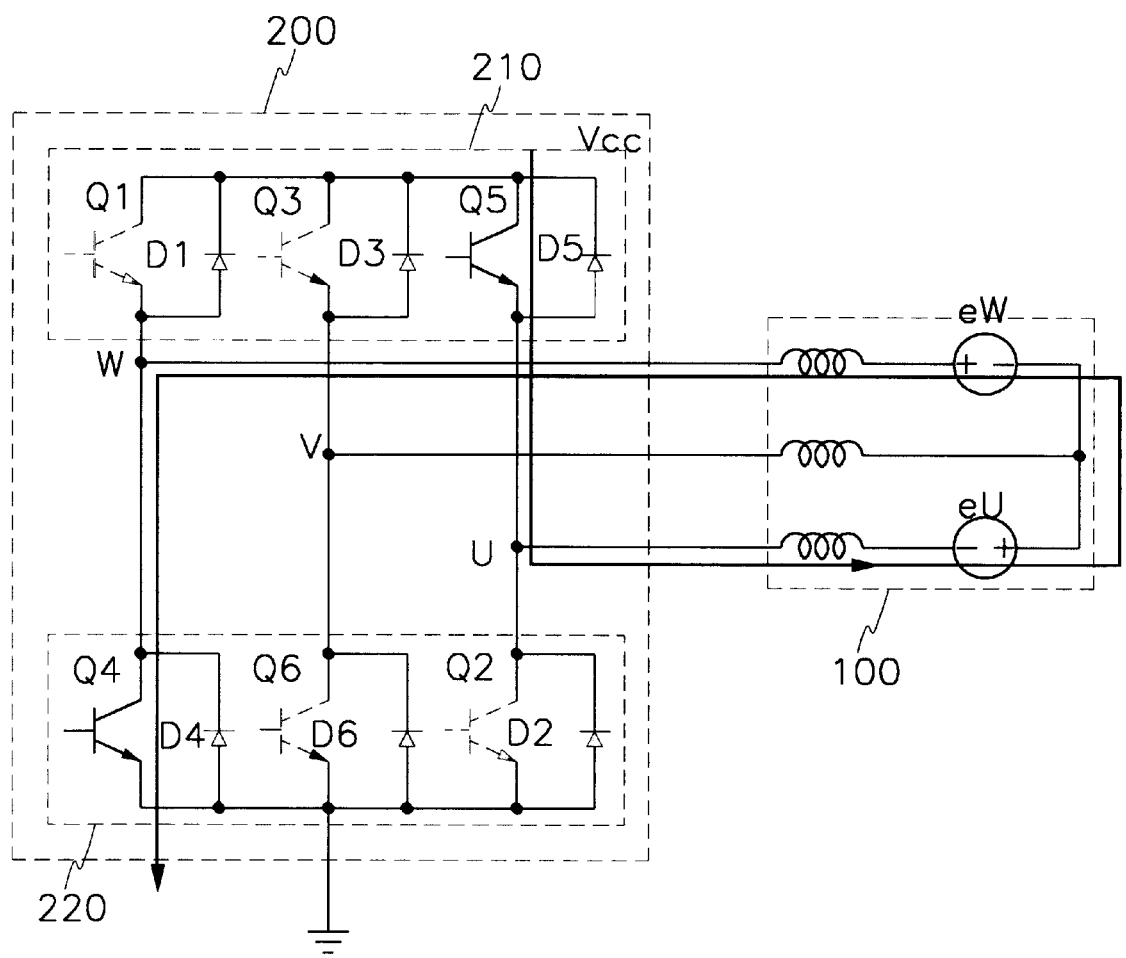

FIGS. 8(a) and (b) respectively show the direction of the current in the forward rotation and reverse brake modes during the period TI of FIG. 6, and FIGS. 8(c) and (d) respectively show the direction of the current in the forward rotation and reverse brake modes during the period T2 of FIG. 6.

As shown in FIG. 8(a), in the forward rotation mode and during the period T1, the upper transistor Q1 and the lower transistor Q6 are turned on and the other transistors are turned off. Therefore, the current of the motor flows in the direction from the W phase to the V phase. On the other hand, as shown in FIG. 8(b), in the reverse brake mode the upper transistor Q3 and the lower transistor Q4 are turned on, and other transistors are turned off in this period. Therefore, the current of the motor flows in the direction from the V phase to the W phase, opposite to the forward rotation mode. As shown in FIGS. 8(c) and (d), during the period T2 the current flowing to the motor in the forward rotation mode is opposite to the current flow in the reverse brake mode.

Next, referring to FIGS. 9(a), 9(b) and 10, the short brake method according to the preferred embodiment of the present invention will now be described.

Figure 9A:
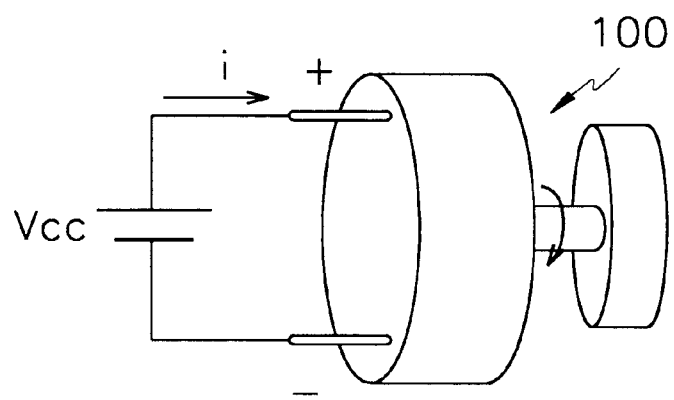
FIGS. 9(a) and (b) show a relationship between the motor and the voltage supplied to the motor in the forward rotation mode and short brake mode.
Figure 9B:
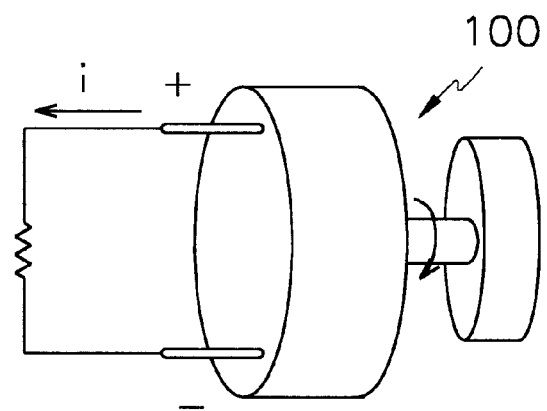

FIGS. 9(a) and (b) show the relationship between the motor and the voltage supplied to the motor in the forward rotation mode and short brake mode respectively. As shown in FIG. 9(b), the motor operates as a power generator (i.e., power source) and the switch as a resistor in the short brake method. Therefore, when the short brake starts, the mechanical energy of the motor changes to electrical energy, and this electrical energy is exhausted as heat energy through the resistor.

Figure 10:
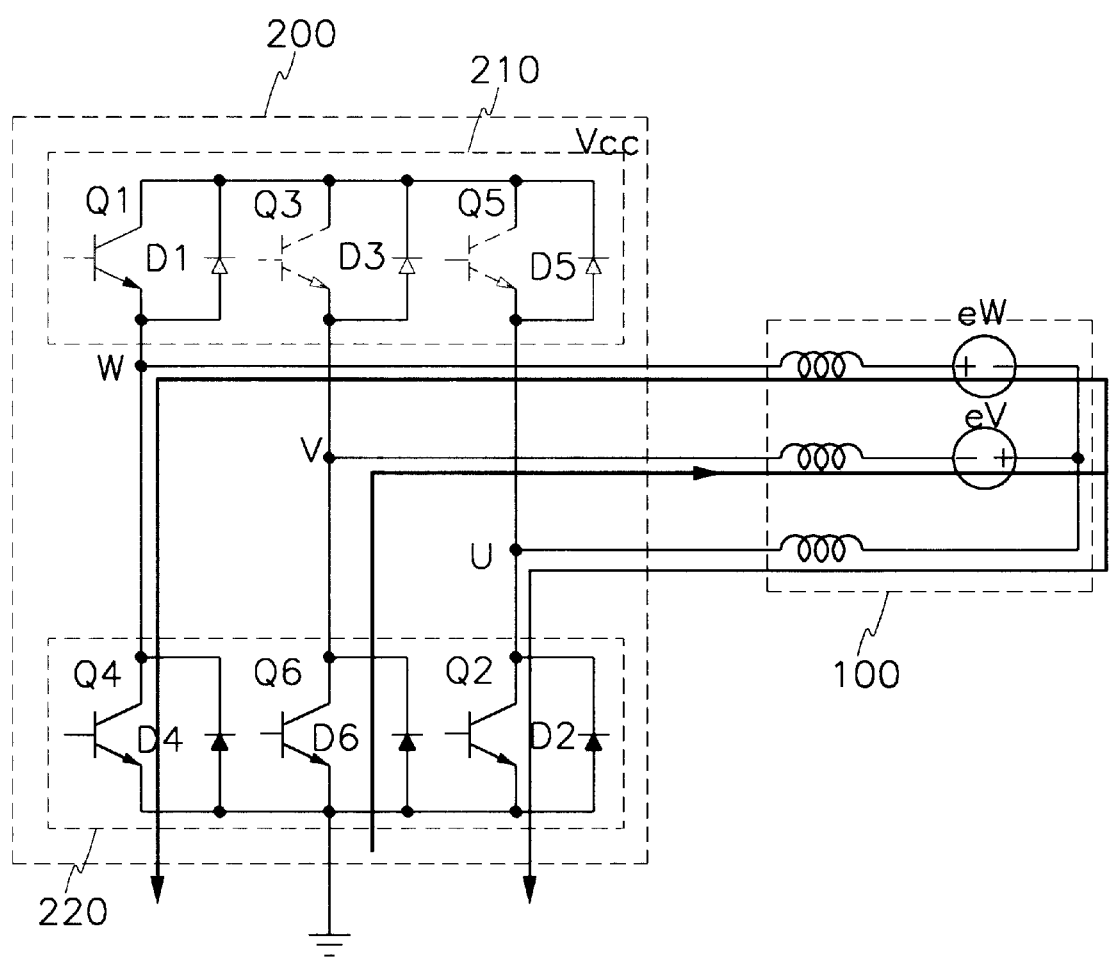
FIG. 10 is a schematic diagram of the current direction of the inverter in the short brake.

FIG. 10 shows an example of the path of the current in the short brake mode.

As shown, when the short brake starts, the upper transistors Q1, Q3 and Q5 are turned off and the lower transistors Q4, Q6 and Q2 are turned on. The current flows from the transistor Q6 and the diode D2 to the other transistors Q4 and Q2 through the motor 100.

As described above, in the first preferred embodiment of the present invention, when a brake start signal is received, the rotation speed of the motor is reduced using the mechanical brake method, and when the rotation speed of the motor is slower than a predetermined speed, the motor is stopped by using an electrical brake method such as the short brake or the reverse brake method. The principle of the brake method according to the first preferred embodiment of the present invention will now be described in detail.

The biggest load on a spindle motor is from a disc type CD-ROM or digital versatile disc (DVD). When the disk rotates, windage losses occur which increase in proportion to the rotation speed.

Figure 11:
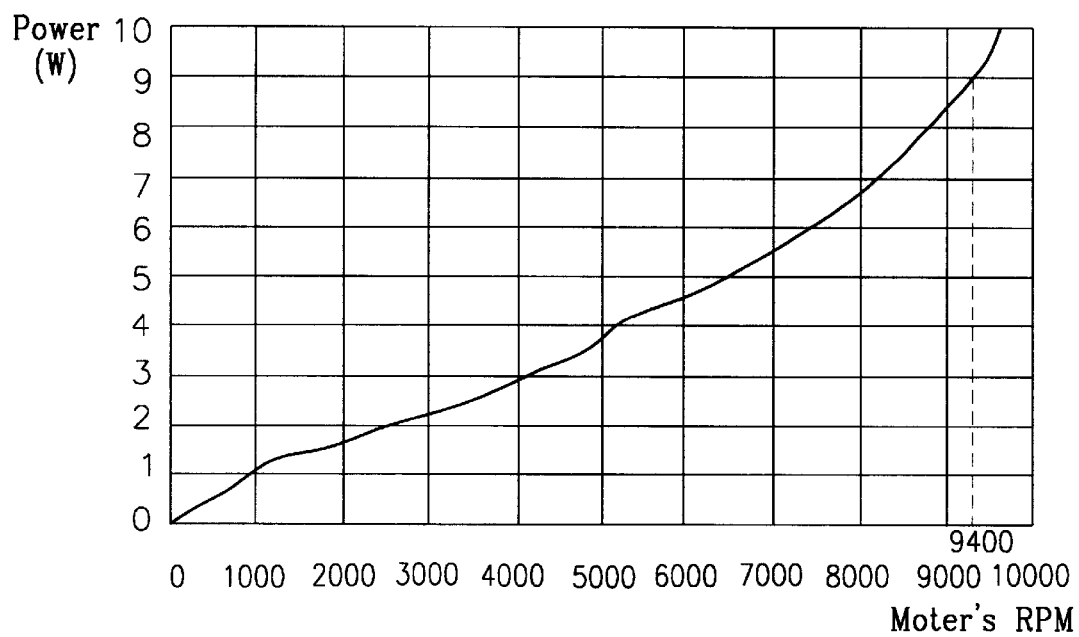
FIG. 11 is a diagram of the relationship between the power supplied to the motor and the motor rotation speed.

FIG. 11 shows a graph indicating the relationship between the rpm of the spindle motor of the 48×-speed CD-ROM and the necessary power of the motor. The horizontal axis indicates the rpm of the motor and the vertical axis indicates the power supplied to the motor. The power needed to rotate the motor is almost proportional to the square of the rpm of the motor.

In the mechanical brake method, the electrical energy externally supplied to the motor is eliminated, and accordingly, all the energy supplied to the motor before the brake operation is exhausted as mechanical frictions. In the case when the spindle motor rotates at a high speed, most energy supplied to the motor before the brake operation is exhausted as the mechanical friction caused by windage.

As shown in FIG. 11, at 9400 rpm the energy exhaustion caused by the windage loss reaches almost 9 W. Therefore, in the case when the motor rotates at a high speed, the mechanical brake (especially the braking caused by the windage loss) is very efficient. Since no current is supplied between the motor and the switch (the transistor) of the inverter in the mechanical brake method, no heat occurs in the switch.

As mentioned above, in the first preferred embodiment of the present invention, in the case when the spindle motor rotates at a fast speed and has a high rate of energy consumption needed to maintain the speed, the mechanical brake method is used to reduce the rotation speed of the motor, and when the rotation speed of the motor reduces to below a predetermined speed, the electrical brake method is used so as to stop the motor. Therefore, since the mechanical brake method is used during the high speed rotation interval, occurrence of heat in the switch can be prevented, and since the electrical brake method is used during the relative low rotation speed interval, the motor can be stopped within a shorter time.

Next, the effects according to the first preferred embodiment of the present invention will be described using measured results.

Figure 12:
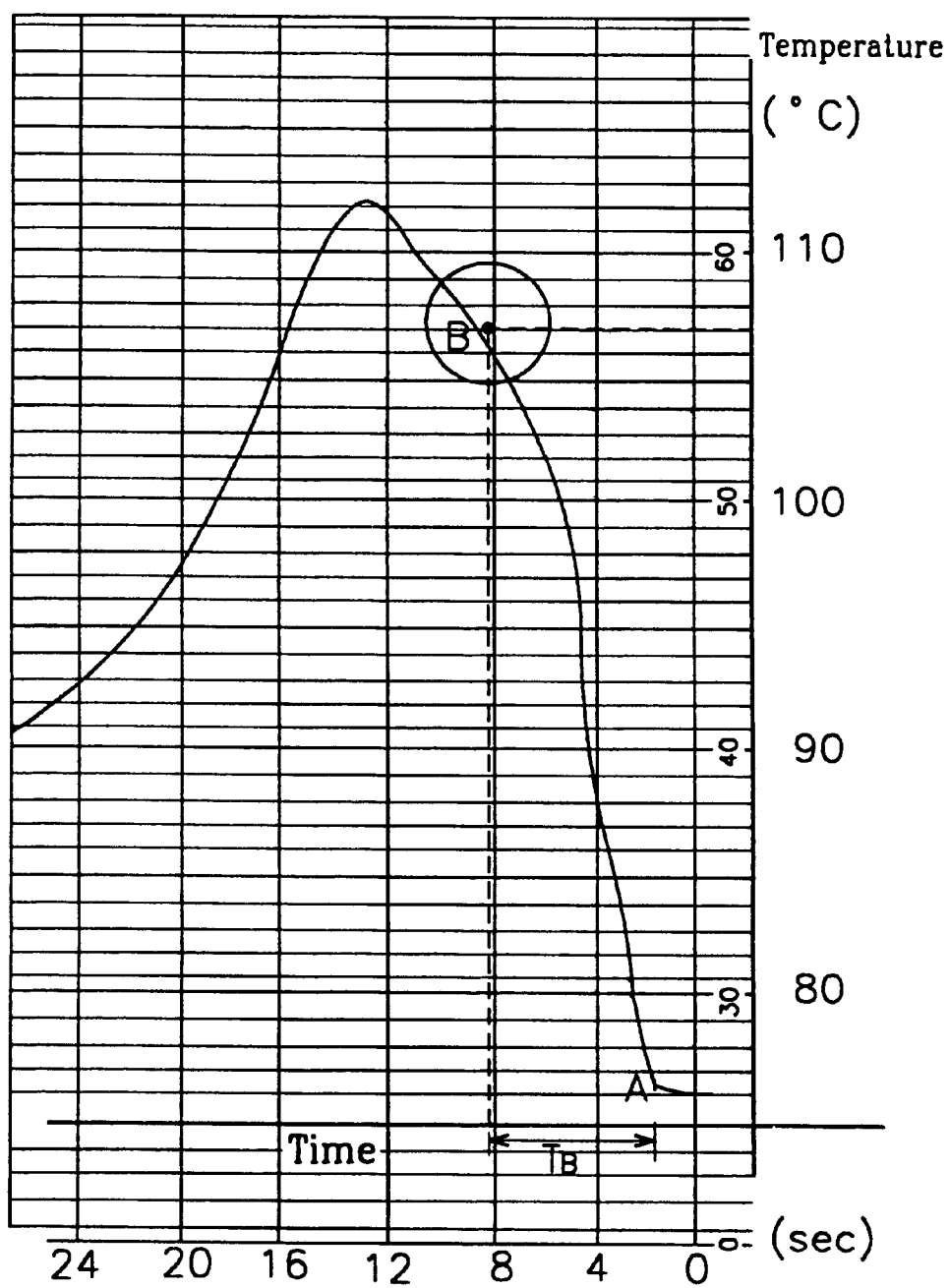
FIG. 12 is a graph indicating the results of stopping time and temperature measurement of an IC when the motor is stopped by applying only the reverse brake method.

FIG. 12 shows a graph indicating the relationship between the time and the measured temperature of the motor driving IC in the case when the reverse brake method is applied to the spindle motor rotating at 9500 rpm. A point A indicates a place where the reverse brake starts and a point B indicates a place where the motor stops. An interval after the point B indicates an interval where the motor moves in the forward rotation.

As shown in FIG. 12, the reverse brake starts at 76° C., the maximum temperature of the brake is 107° C., and the brake time Tb is 6.6 seconds. Therefore, the slope of increase of the temperature per brake time is 4.8° C./sec.

Figure 13:
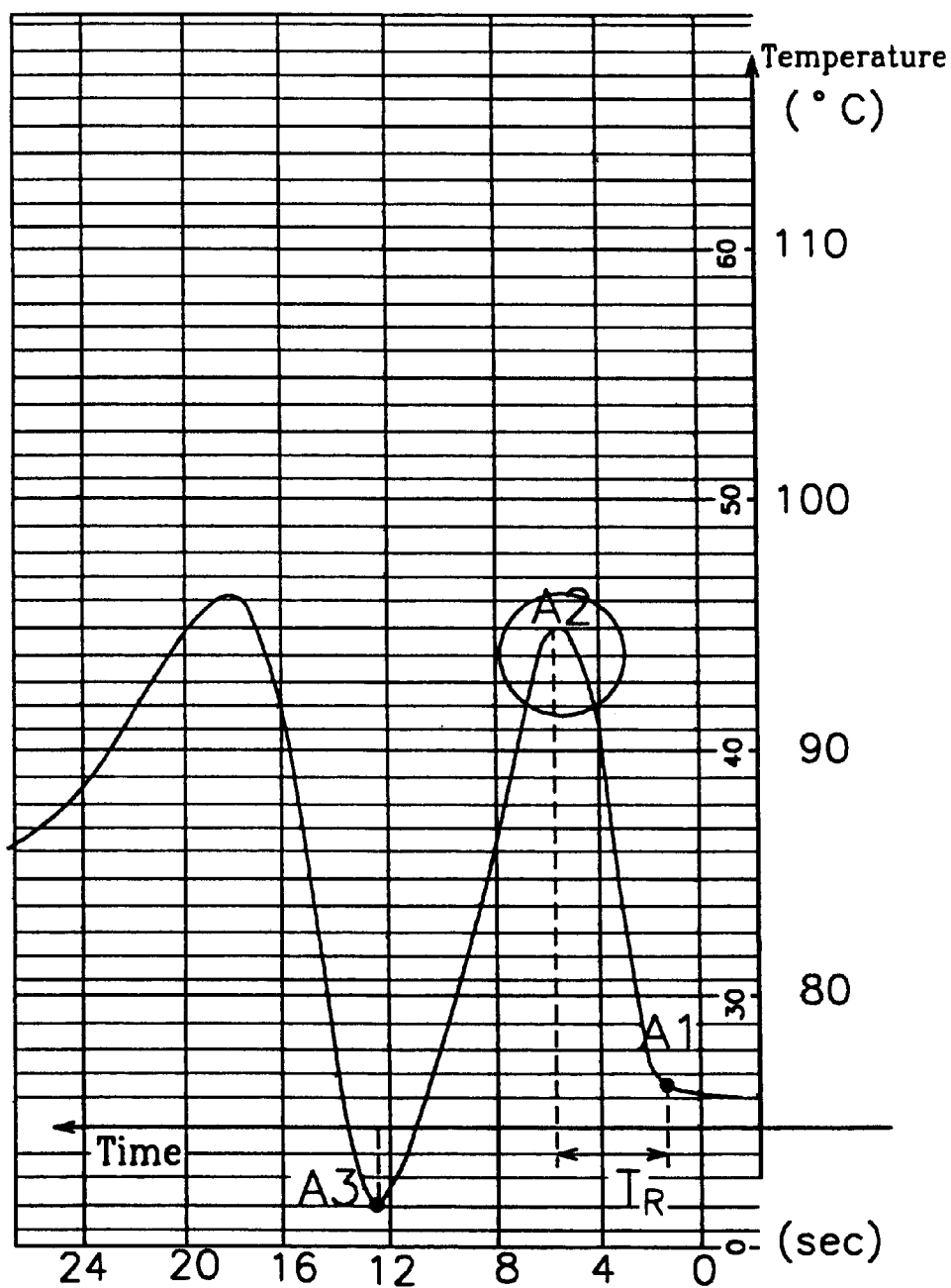
FIG. 13 is a graph indicating the results of stopping time and temperature measurement of an IC when the motor is stopped by applying only the short brake method.

FIG. 13 shows a graph indicating the relationship between the time and the measured temperature of the motor driving IC in the case when the short brake method is applied to the spindle motor rotating at 9500 rpm. A point A1 indicates a place where the short brake starts and a point A2 indicates a place where the motor stops. A point A3 indicates a point where the motor again moves in the forward rotation.

As shown in FIG. 13, the short brake starts at 76° C., the maximum temperature of the brake is 95° C., and the brake time Tb is 4 second. Therefore, the slope of increase of the temperature per brake time is 4.75° C./sec.

Figure 14:
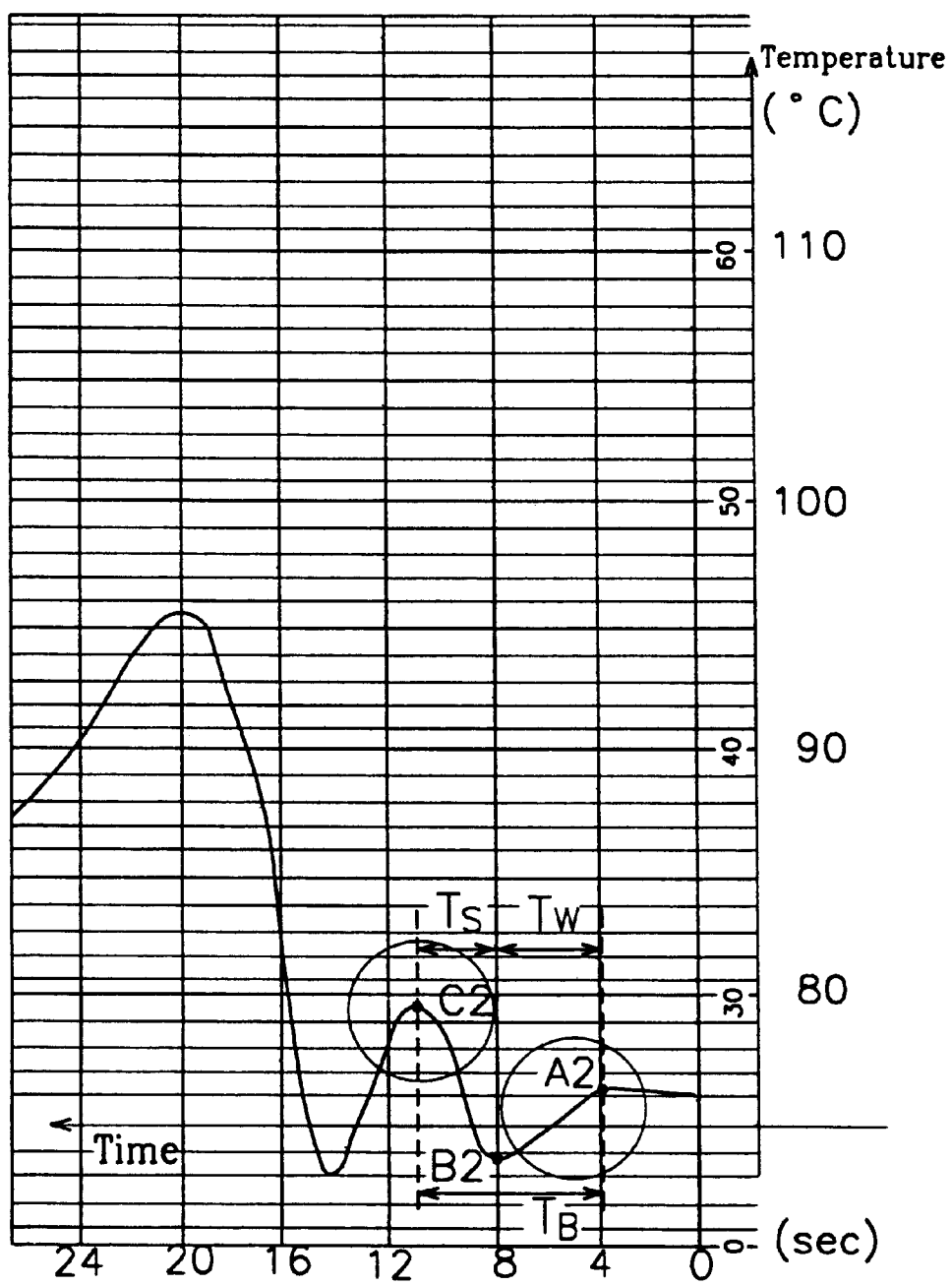
FIG. 14 is a graph indicating the results of stopping time and temperature measurement of an IC according to the preferred embodiment of the present invention.

FIG. 14 shows a graph indicating the relationship between the time and the measured temperature of the motor driving IC in the case when the brake method according to the first preferred embodiment of the present invention is applied to the spindle motor rotating at 9500 rpm. A point A2 indicates a place where the mechanical brake starts, a point B2 indicates a place where the short brake starts, and a point C2 indicates a place where the motor stops. In the measured results of FIG. 14, the mechanical brake starts when the motor rotates at 9500 rpm, and the short brake starts when the motor rotates at 6000 rpm.

As shown in FIG. 14, the short brake starts at 76° C., the maximumtemperature of the brake is 79.5° C., and the brake time Tb is 6.8 seconds. Therefore, the slope of increase of the temperature per brake time is 0.51° C./sec.

The simulation results illustrated in FIGS. 12 through 14 are as follows.

TABLE 1

| | The maximum temperature of the brake [° C.] | The brake time [sec] | Increased temperature [° C.] | Temperature/ time [° C./sec] |
| --- | --- | --- | --- | --- |
| Reverse brake | 107 | 6.6 | 31 | 4.8 |
| Short brake | 95 | 4 | 19 | 4.7 |
| Brake according to the preferred embodiment | 79.5 | 6.8 | 3.5 | 0.51 |

As shown in TABLE 1, the brake method according to the preferred embodiment of the present invention has a much lower maximum temperature compared to the reverse brake or short brake method, and the brake times are not much different. Therefore, it is found that the brake method according to the preferred embodiment of the present invention is very efficient.

Figure 15:
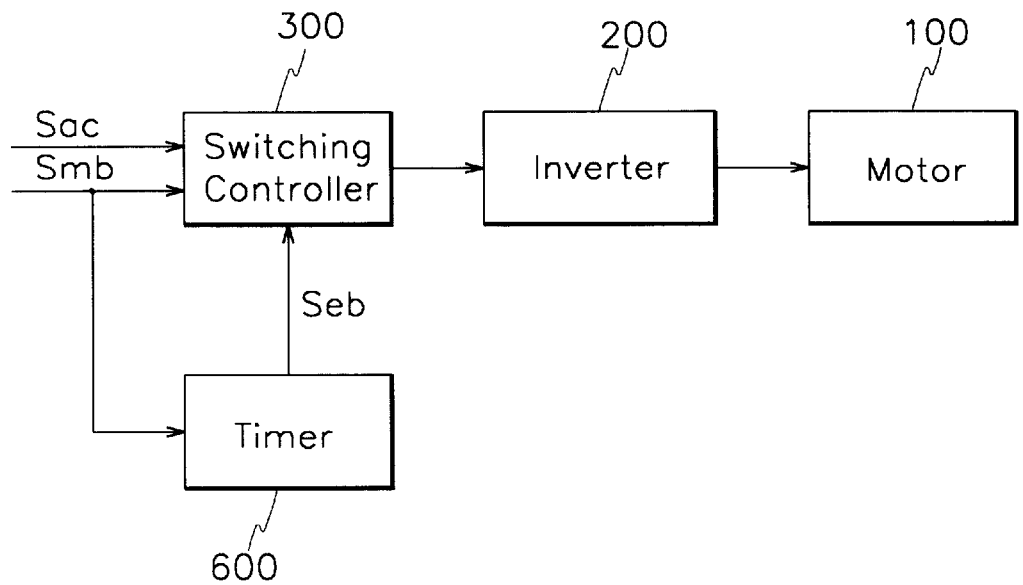
FIG. 15 is a schematic diagram of a motor control system according to a second preferred embodiment of the present invention.
Figure 16:
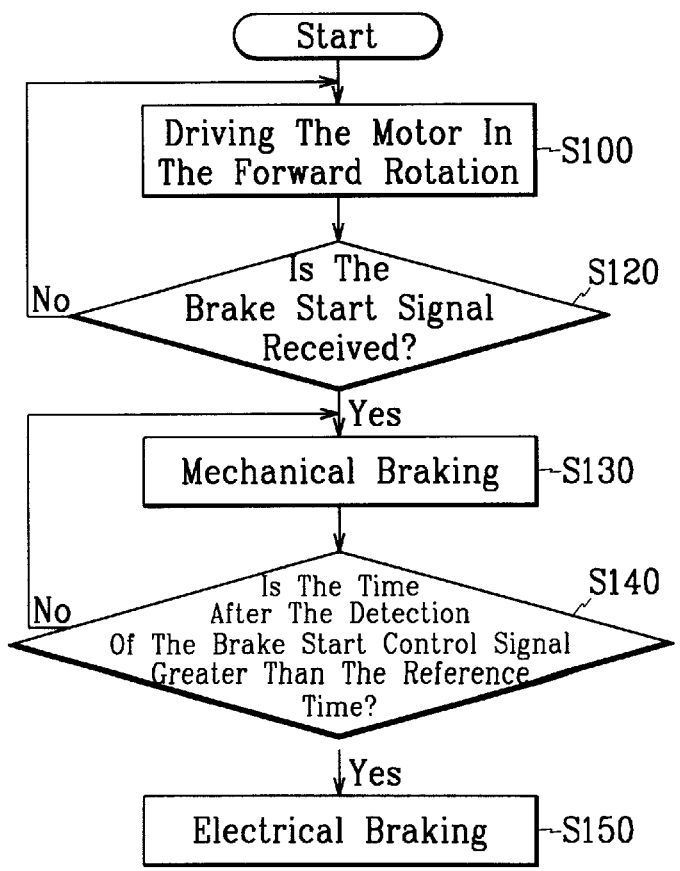
FIG. 16 is a flow chart indicating an operation of the motor control system according to the second preferred embodiment of the present invention.

Referring to FIGS. 15 and 16, a second preferred embodiment of the present invention will now be described.

FIG. 15 shows a motor control system according to the second preferred embodiment of the present invention. As shown, the motor control system comprises a motor 100, an inverter 200, a switching controller 300, and a timer 600. Since operations of the motor 100, inverter 200 and the switching controller 300 according to the second preferred embodiment of the present invention are identical with the operations according to the first preferred embodiment of the present invention, the descriptions will not be repeated.

The timer 600 receives a brake start control signal Smb from the outside, and after the brake start signal is provided and a predetermined time is passed, the timer 600 outputs an electrical brake start signal Seb to the switching controller 300. When the switching controller 300 receives a brake start control signal Smb from the outside, the switching controller 300 controls the switches of the inverter in order for the motor to operate in the mechanical brake mode, and when the switching controller 300 receives the electrical brake start signal Seb from the timer 600, the switching controller 300 controls the inverter in order for the motor to operate in the short brake or reverse brake method.

FIG. 16 shows a flow chart indicating the operation of the motor control system according to the second preferred embodiment of the present invention.

First, when a motor accelerating control signal Sac is supplied to the switching controller 300 from the outside, the switching controller 300 adjusts the switching sequences of each transistor of the inverter 200 in order for the motor to move in the forward rotation in step S110. Next, the switching controller 300 determines whether it has received a brake start control signal Smb from the outside in step S120, and when the brake start control signal Smb is received, the motor is mechanically braked in step S130. That is, when the switching controller 300 receives the brake start control signal Smb, all the transistors of the inverter are turned off so that the current is not supplied to the motor from the external power and the current based on the BEMF of the motor is not supplied to the ground. Therefore, since the energy that the motor has is exhausted by the friction, the rotation speed of the motor gradually decreases.

At this time, the timer 600 checks the time when the brake start control signal is supplied, and compares the checked time with a predetermined reference value in step S140. In case the checked time in the above step is greater than the predetermined reference value, the timer 600 outputs an electrical brake start signal Seb to the switching controller 300. When the switching controller 300 receives the electrical brake start signal Seb, the switching controller 300 makes the motor brake with the reverse brake or short brake method.

The second preferred embodiment of the present invention operates the electrical brake after a predetermined reference time has elapsed from a point when the motor starts the mechanical brake, differing from the first preferred embodiment of the present invention where the rotation speed of the motor is detected and the detected rotation speed is compared with a reference value so as to determine whether to operate the electrical brake.

In this second preferred embodiment of the present invention, it is effective if the rotation speed of the motor is constant before the motor is braked. For example, when the motor constantly rotates at 9000 rpm before the motor is braked, and if a user wants the motor to be electrically braked when the motor rotates at 6000 rpm, the time from when the mechanical braking is performed to when the rpm of the motor reduces to 6000 rpm will be previously measured before manufacturing of the products, and this measured time is set as the reference time, thereby effectively controlling the brake operation of the brake.

On the other hand, in the second preferred embodiment of the present invention, for the cases when the motor rotates in various speed modes such as play mode, fast play mode and fast rewinding mode in a VCR, the reference time set at the timer can be set according to the speed modes of the motor. Therefore, in case of operation in the A mode, the electrical brake time is determined with respect to the corresponding set time so that the brake operation of the motor can be effectively controlled for each speed mode.

The mechanical brake method as described above stops supplying the electrical energy to the motor by turning off all the transistors of the inverter, and therefore the energy of the motor is exhausted as friction energy. However, this brake method may have the following drawbacks. That is, in the case when all the transistors of the inverter are turned off, the current based on the BEMF of the motor is supplied to the voltage source Vcc through the freewheeling state diodes D1, D3 and D5 of the upper switch unit 210 for a very short period of time. Therefore, when the BEMF of the motor is great, a large current can instantaneously flow through the freewheeling diodes, and thereby the freewheeling state diodes can be damaged.

In consideration of this, the following mechanical brake method can be used.

That is, when the brake operation starts, not all the transistors of the inverter are turned off to abruptly stop supplying the electrical energy to the motor, but the current supplied to the base of the transistor of the inverter is reduced so that the current supplied to the motor is reduced. In other words, the energy supplied to the motor is reduced, and therefore the rotation speed of the motor is reduced. In this mechanical brake method, since the supply of the current to the voltage source Vcc through the freewheeling state diodes at the moment the transistors are turned off is lower, the damage to the freewheeling state diodes can be prevented. Also, since the energy supplied to the motor is smaller than the energy that the motor has before the brake operation in this method, the energy that the motor has is exhausted by mechanical friction, and thereby the rotation speed of the motor is decreased.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A method for controlling a motor control circuit comprising an inverter, including a first switch unit comprising a plurality of switches coupled between each voltage source and phase of the motor and a second switch unit comprising a plurality of switches coupled between each motor and the ground, and a switching controller controlling on/off operations of each switch of the inverter, the method comprising the steps of:

(a) adjusting switching sequences of the switches of the inverter and adjusting direction of the current flowing to the motor in order for the motor to rotate in the forward direction;

(b) turning off all the switches of the inverter in order for the rotation speed of the motor to reduce by mechanical frictions; and (c) making, when the reduced speed of the motor is slower than a first speed, the energy supplied to the motor be exhausted through the switches of the inverter whereby all the switches of the first switch unit are turned off and all the switches of the second switch unit are turned on in order to reduce the speed of the motor.

2. The method of claim 1, wherein the step (b) comprises the steps of:

determining whether a brake start control signal is received from the outside; and turning off all the switches of the inverter when the brake start control signal is received.

3. The method of claim 1, wherein the step (c) comprises the steps of:

computing the rotation speed of the motor;

comparing the computed rotation speed of the motor with a first rotation speed outputting an electrical brake start signal to the switching controller when the rotation speed of the motor is slower than the first rotation speed; and controlling the on/off operations of the switches of the inverter responsive to the electrical brake start signal.

4. The method of claim 3, wherein the step of computing the rotation speed of the motor comprises the steps of:

comparing a hall signal from a hall sensor with a reference signal and outputting pulse type signals;

measuring the number of the pulse type signals for a predetermined time; and computing the rotation speed of the motor using the predetermined time and the number of the pulse type signals.

5. The method of claim 3, wherein the rotation speed of the motor is obtained from information stored in a storage media driven by the motor.

6. A method for controlling a motor control circuit comprising an inverter including a first switch unit comprising a plurality of switches coupled between each voltage source and phase of the motor and a second switch unit comprising a plurality of switches coupled between each motor and the ground, and a switching controller controlling on/off operations of each switch of the inverter, the method comprising the steps of:

(a) adjusting switching sequences of the switches of the inverter and adjusting direction of the current flowing to the motor in order for the motor to rotate in the forward direction;

(b) turning off all the switches of the inverter in order for the rotation speed of the motor to reduce by mechanical frictions; and (c) making, when a first time is passed after all the switches of the inverter are turned off, the energy supplied to the motor be exhausted through the switches of the inverter whereby all the switches of the first switch unit are turned off and all the switches of the second switch unit are turned on in order to reduce the speed of the motor.

7. The method of claim 6, wherein the step (b) comprises the steps of:

determining whether a brake start control signal is received from the outside; and turning off all the switches of the inverter when the brake start control signal is received.

8. A motor control circuit comprising:

an inverter including a first switch unit comprising a plurality of switches coupled between each voltage source and phase of the motor and a second switch unit comprising a plurality of switches coupled between each motor and the ground;

a switching controller, when receiving an acceleration signal from the outside, controlling the switching sequences of the switches of the inverter in order for the motor to rotate in the forward direction, and when receiving a brake start control signal from the outside, turning off all the switches of the inverter so that the rotation speed of the motor is reduced by the mechanical frictions; and an electrical brake determiner outputting an electrical brake start signal to the switching controller when the rotation speed of the motor is slower than a first speed because of the mechanical frictions of the motor, wherein the switching controller, when receiving the electrical brake start signal from the electrical brake determiner, turns off all the switches of the first switch unit and turns on all the switches of the:second switch unit whereby the energy supplied to the motor be exhausted through the switches of the inverter so that the speed of the motor is reduced.

9. The circuit of claim 8, the electrical brake determiner comprises:

a speed detector detecting the rotation speed of the motor; and a speed comparator comparing the detected rotation speed of the motor with the first speed, and when the rotation speed of the motor is slower than the first speed, outputting the electrical brake start signal to the switching controller.

10. The circuit of claim 9, wherein the speed detector comprises:

a comparator comparing a hall signal from a hall sensor with a reference voltage and outputting pulse type signals; and a counter receiving the output signals of the comparator and counting the number of the pulse type signals, and computing the rotation speed of the motor from the counted pulse type signals and counting time.

11. The circuit of claim 9, wherein the speed detector obtains..the rotation speed of the motor through information stored in a storage media driven by the motor.

12. A motor control circuit comprising:

an inverter including a first switch unit comprising a plurality of switches coupled between each voltage source and phase of the motor and a second switch unit comprising a plurality of switches coupled between each motor and the ground;

switching controller, when receiving an acceleration signal from the outside, controlling the switching sequences of the switches of the inverter in order for the motor to rotate in the forward direction, and when receiving a brake start control signal from the outside, turning off all the switches of the inverter so that the rotation speed of the motor is reduced by the mechanical frictions; and a timer outputting an electrical brake start signal to the switching controller after a first reference time is passed from a time when the brake start control signal is received, wherein the switching controller, when receiving the electrical brake start signal from the timer, turns off all the switches of the first switch unit and turns on all the switches of the second switch unit whereby the energy supplied to the motor is exhausted through the switches of the inverter so that the speed of the motor is reduced.

13. A method for controlling a motor control circuit comprising an inverter including a first switch unit comprising a plurality of switches coupled between each voltage source and phase of the motor and a second switch unit comprising a plurality of switches coupled between each motor and the ground, and a switching controller controlling on/off operations of each switch of the inverter, the method comprising the steps of:

(a) adjusting switching sequences of the transistors of the inverter and adjusting direction of the current flowing to the motor in order for the motor to rotate in the forward direction;

(b) adjusting a base current supplied to the transistors of the inverter, and thereby reducing the current flowing to the motor in order for the rotation speed of the motor to reduce by mechanical frictions; and (c) making, when the reduced speed of the motor is slower than a first speed, the energy supplied to the motor be exhausted through the transistors of the inverter in order to reduce the speed of the motor.

14. The method of claim 13, wherein step (c) is characterized in that all the transistors of the first switch unit are turned off and all the transistors of the second switch unit are turned on so as to reduce the speed of the motor.

15. A method for controlling a motor control circuit comprising an inverter including a first switch unit comprising a plurality of switches coupled between each voltage source and phase of the motor and a second switch unit comprising a plurality of switches coupled between each motor and the ground, and a switching controller controlling on/off operations of each switch of the inverter, the method comprising the steps of:

(a) adjusting switching sequences of the transistors of the inverter and adjusting direction of the current flowing to the motor in order for the motor to rotate in the forward direction;

(b) adjusting a base current supplied to the transistors of the inverter and thereby, reducing the current flowing to the motor in order for the rotation speed of the motor to reduce by mechanical frictions; and (c) making the energy supplied to the motor be exhausted at the transistors of the inverter after a first time is passed from a time when all the transistors of the inverter are turned off whereby all the transistors of the first switch unit are turned off and all the transistors of the second switch unit are turned on so as to reduce the speed of the motor.

* * * * *